(12) United States Patent
Tien

(10) Patent No.: US 6,981,643 B2
(45) Date of Patent: Jan. 3, 2006

(54) OPTICAL SCANNER FOR READING A BARCODE

(75) Inventor: Kai-Yuan Tien, Changhua (TW)

(73) Assignee: Riotec Corp., Taipei (TW)

( * ) Notice: Subject to any disclaimer, the term of this patent is extended or adjusted under 35 U.S.C. 154(b) by 0 days.

(21) Appl. No.: 10/394,181

(22) Filed: Mar. 24, 2003

(65) Prior Publication Data

US 2004/0188527 A1 Sep. 30, 2004

(51) Int. Cl.
*G06K 7/10* (2006.01)

(52) U.S. Cl. .......................... 235/462.01; 235/462.32; 235/462.35; 235/462.36; 235/462.37; 235/462.38; 235/462.4

(58) Field of Classification Search ........... 235/462.01, 235/462.24, 462.36, 462.42, 462.32, 462.35, 235/462.37, 462.38, 462.4
See application file for complete search history.

(56) References Cited

U.S. PATENT DOCUMENTS

| | | | | |
|---|---|---|---|---|
| 4,460,120 A | * | 7/1984 | Shepard et al. | 235/462.46 |
| 4,999,482 A | * | 3/1991 | Yang | 235/462.34 |
| 5,166,820 A | * | 11/1992 | Fujita | 359/211 |
| 5,796,087 A | * | 8/1998 | Hazama | 235/462.38 |
| 5,945,670 A | * | 8/1999 | Rudeen | 250/235 |
| 6,123,261 A | * | 9/2000 | Roustaei | 235/462.01 |
| 6,290,135 B1 | * | 9/2001 | Acosta et al. | 235/472.01 |

* cited by examiner

*Primary Examiner*—Ahshik Kim
(74) *Attorney, Agent, or Firm*—Troxell Law Office, PLLC

(57) ABSTRACT

A barcode scanner includes at least a laser emitter, a collimator, a light condensing lens and a linear light receiver. When the scanning light beams from the laser emitter are projected onto a barcode through the collimator, a barcode signal is produced from the reflected image thereof focused onto the linear light receiver through the light condensing lens. The characteristics thereof are that at least one beam splitter and reflector are disposed at the projecting path of the scanning light beams from the laser emitter and the collimator to barcode, so as to enable the scanner to act as a multiple light sources structure, thereby distributing the scanning light beams more evenly with lower production cost and material.

7 Claims, 6 Drawing Sheets

OPTICAL SCANNER FOR READING A BARCODE

BACKGROUND OF THE INVENTION (a) Field of the Invention

The invention relates to a barcode scanner, and more particularly, to a barcode scanner capable of obtaining an effect of at least two projecting light sources using one set of laser emitter and collimator along with at least one set of beam splitter and reflector, so as to have the scanning light beams distribute evenly as well as saving production cost and material.

(b) Description of the Prior Art

FIG. 6 shows a conventional schematic view of a barcode scanner 1 having a laser emitter as the light source thereof. The structure at least comprises a laser emitter a, a collimator b (generally a piano-convex column lens that is located horizontally for converting laser light beams as strip-shaped light beams), a light condensing lens c and a linear light receiver d (may be a linear CCD sensor or a linear CMOS sensor), and the laser light source a and the collimator b are disposed at one lateral side of the light condensing lens c. After the light beams emitted from the laser emitter a are converted into strip-shaped scanning light beams after passing through the collimator b, the scanning light beams are then projected in a form of strip-shaped onto a barcode e, and the reflected images of the scanning light beams at the barcode e are focused at the linear light receiver d through the light condensing lens c. Referring to FIG. 7, the light intensity distribution at the receiving plane of the linear light receiver displays a curved pattern. The strongest light intensity thereof exists at the center of the linear light receiver d (as indicated by the centerline of the curve in FIG. 7); whereas the light intensity gets weaker as approaching the lateral sides of the linear light receiver d (the lateral side distant from the center of the linear receiver are indicated by the dotted lines in FIG. 7); that is, the reflected light beams thereof are unevenly reflected upon the receiving plane of the long linear light receiver, and a shortcoming is thus brought about for that the image information cannot be easily read by a rear-end circuit thereof.

In order to overcome the shortcoming of the aforesaid prior structure 1 described in FIG. 6, industrialists have later developed another prior structure 2 as shown in FIG. 8, wherein a laser emitter a and a collimator b are laterally disposed at each side of both sides of the light condensing lens c, so as to project and overlap light beams from two light sources onto a barcode e. The light intensity distribution of the reflected light beams at the receiving plane of the linear light receiver d displays a plateau curved line as shown in FIG. 9 (the solid line formed by the dotted lines of the overlapping light beams). Through this design, even if the light range of the projecting area is broadened, the light intensity at the receiving plane of the linear light receiver d remains quite even for increasing the light intensity reflected at the lateral sides of the linear light receiver d for better reading. Nevertheless, the light intensity at the two lateral sides of the receiving plane of the linear light receiver d somewhat accounts as insufficient (the dotted lines at the sides as shown in FIG. 9), and therefore this prior structure needs at least two sets of laser emitters and collimators that subsequently increase the production cost and material thereof; it is necessary to improve such prior art.

SUMMARY OF THE INVENTION

The object of the invention is to provide a barcode scanner capable of surmounting the shortcomings of the two aforesaid structures by distributing light beams evenly and reducing at least one set of laser emitters and collimators; in addition, the light beams are distributed more evenly by more split light beams.

To accomplish the above object, in principle, at least one beam splitter and reflectors are disposed at the projecting paths of the light beams from the laser emitters and collimators in accordance with the invention. The beam splitters and reflectors enable the scanner to act as a structure having multiple light sources for distributing the light beams more evenly and saving production cost and material thereof.

DETAILED DESCRIPTION OF THE PREFERRED EMBODIMENTS

To better understand the technical characteristics and functions of the invention, descriptions shall be given with the accompanying drawings hereunder.

Figure 1:
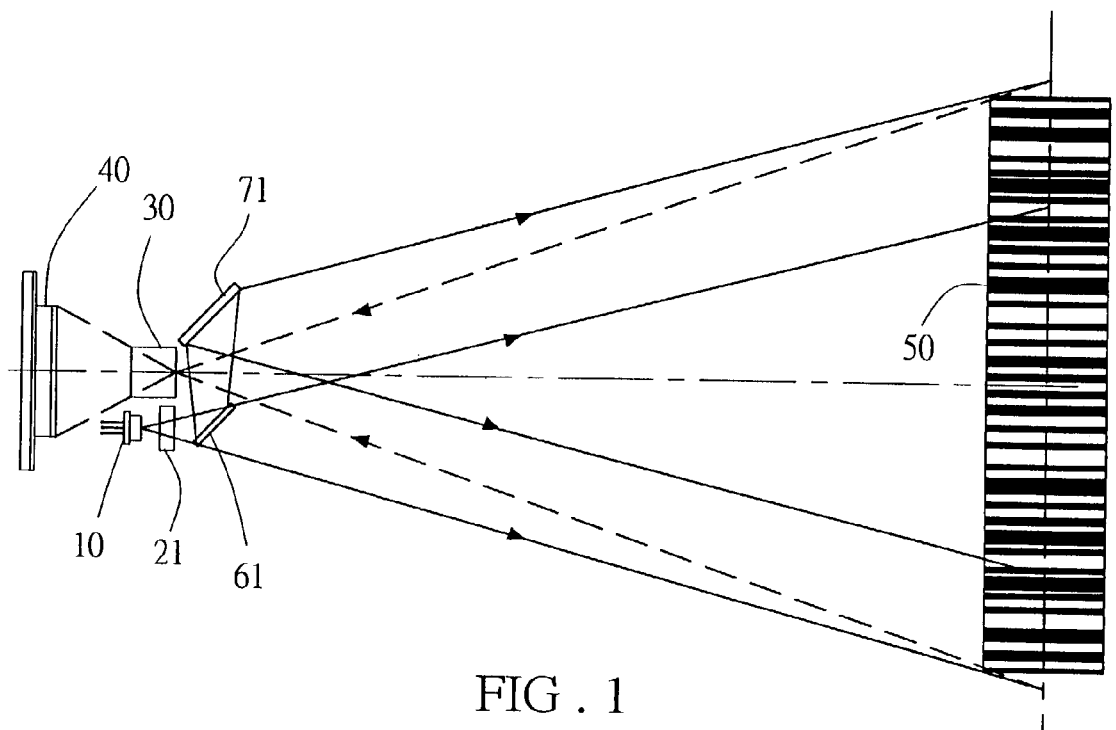
FIG. 1 shows a top view of an embodiment of the barcode scanner according to the invention.

Referring to FIG. 1, the barcode scanner in accordance with the invention comprises a laser emitter 10, a collimator 21 (the collimator 21 is a plano-convex column lens that is located horizontally same as prior structure 1 and structure 2 for converting the laser beams thereof into strip-shaped scanning light beams), a light condensing lens 30 and a linear light receiver 40 (may be a linear CCD sensor or a linear CMOS sensor). The characteristics of the structure are that at least one beam splitter 61 (62) and a reflector 71 are disposed at the projecting path of the scanning light beams from the laser emitter 10 and the collimator 21, so as to enable the scanner to act as a structure having multiple light sources for distributing the scanning light beams more evenly and saving production cost and material thereof.

Figure 2:
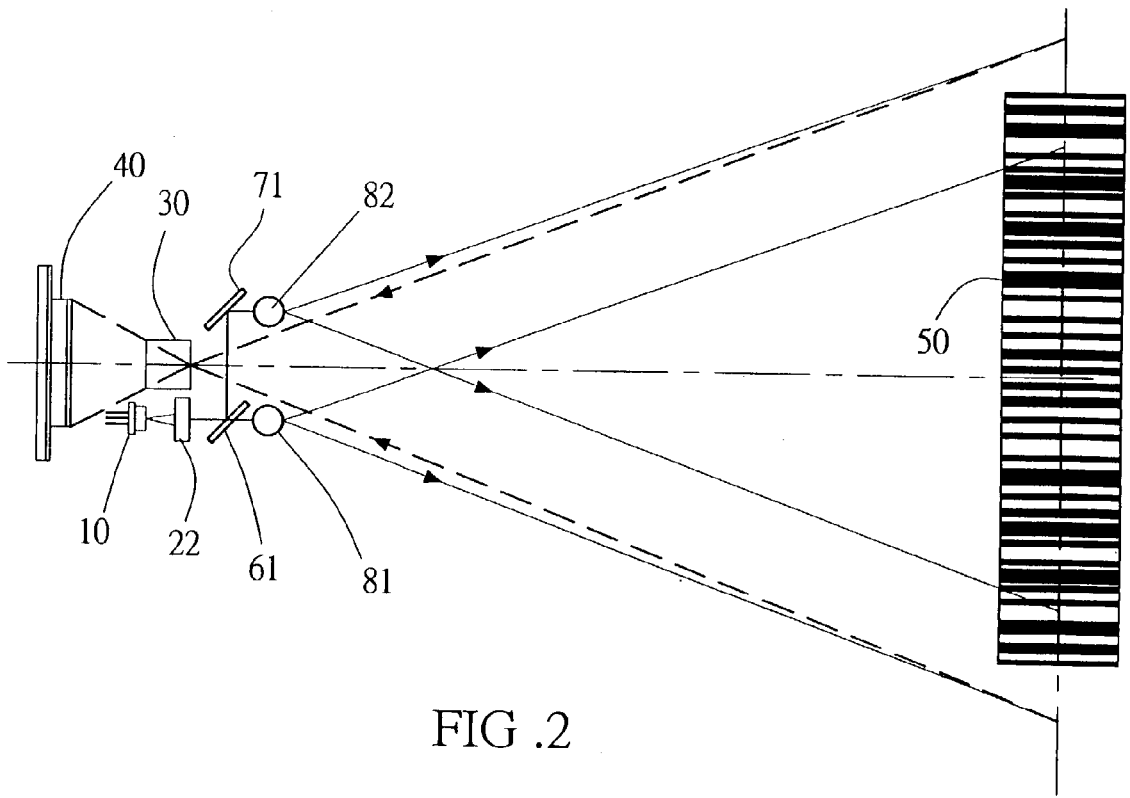
FIG. 2 shows a top view of another embodiment of the barcode scanner according to the invention.
Figure 3:
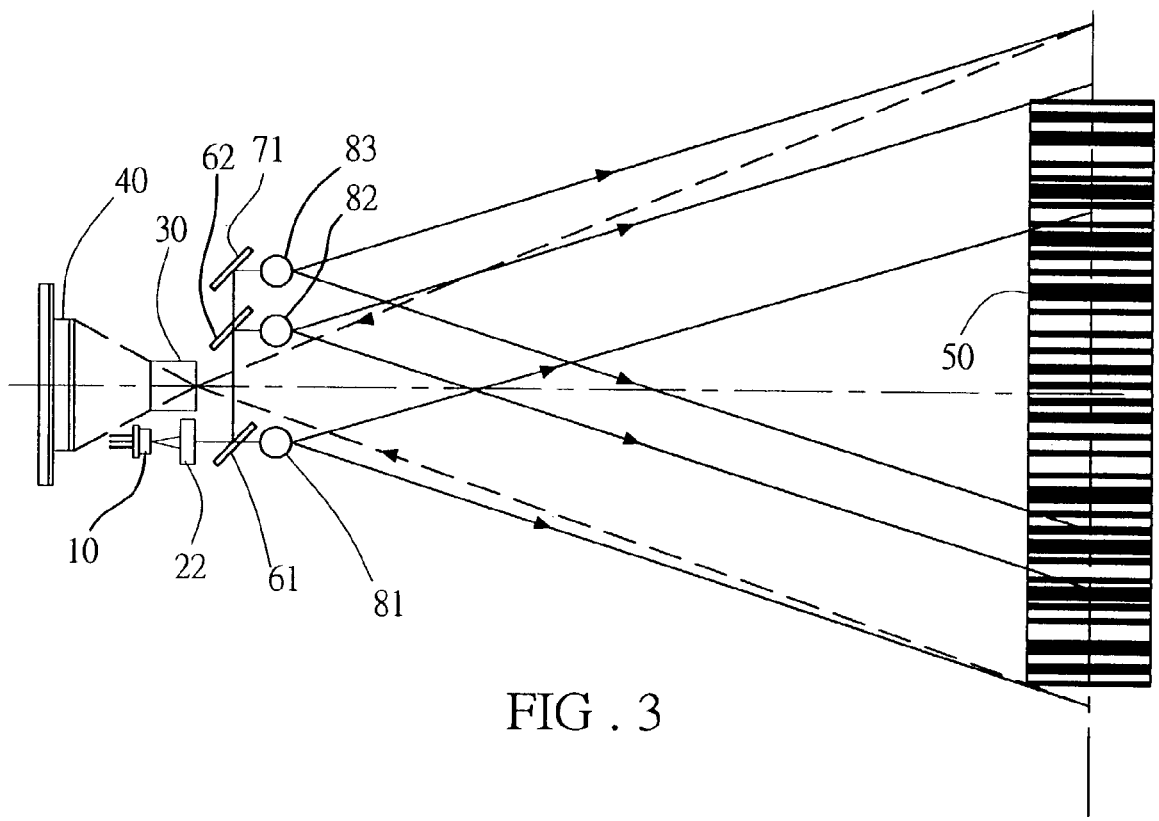
FIG. 3 shows a top view of another embodiment of the barcode scanner according to the invention.

According to the above structure and referring to FIGS. 2 and 3, an collimator 22 is adopted in the embodiment(s) (the collimator 22 is an aspherical lens for converting the laser beams into point-shaped parallel light beams that are further converted into strip-shaped scanning light beams by using a corresponding standing cylindrical lens), and at least one standing cylindrical lenses 81 (82,83) are additionally provided at the each projecting paths from the beam splitters 61 (62) and the reflector 71 to the barcode. The standing cylindrical lens will convert the point-shaped parallel light beams into strip-shaped scanning light beams to project on the barcode to be read.

Figure 8:
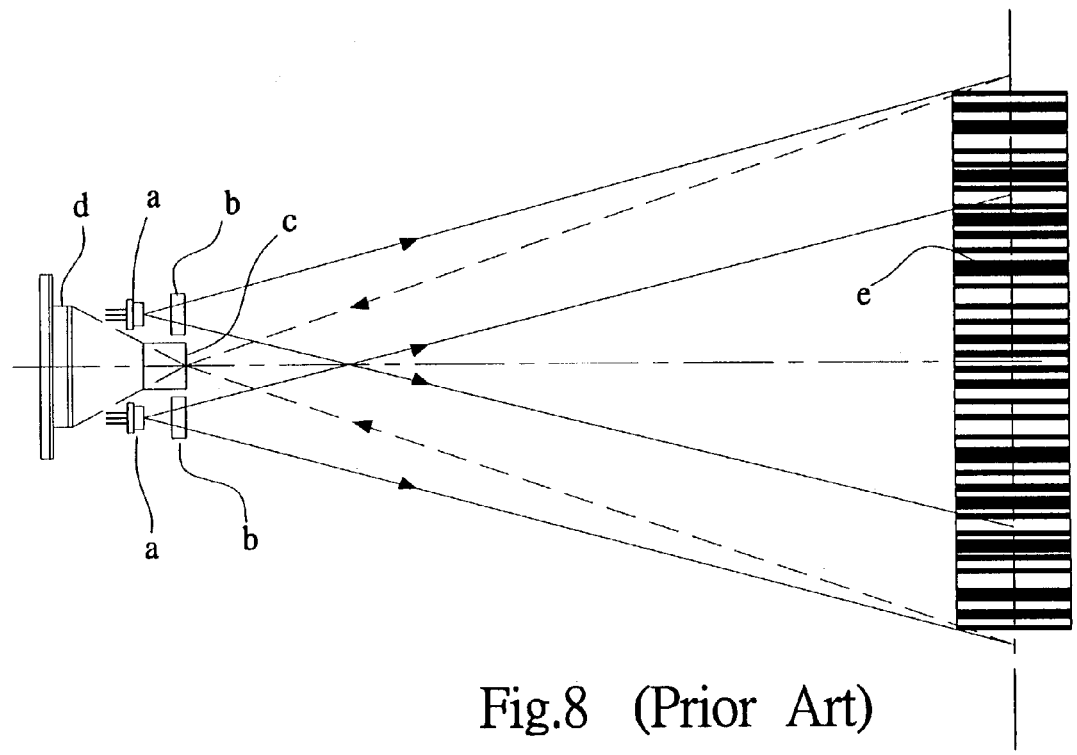
FIG. 8 shows a conventional top view of a prior structure 2.
Figure 9:
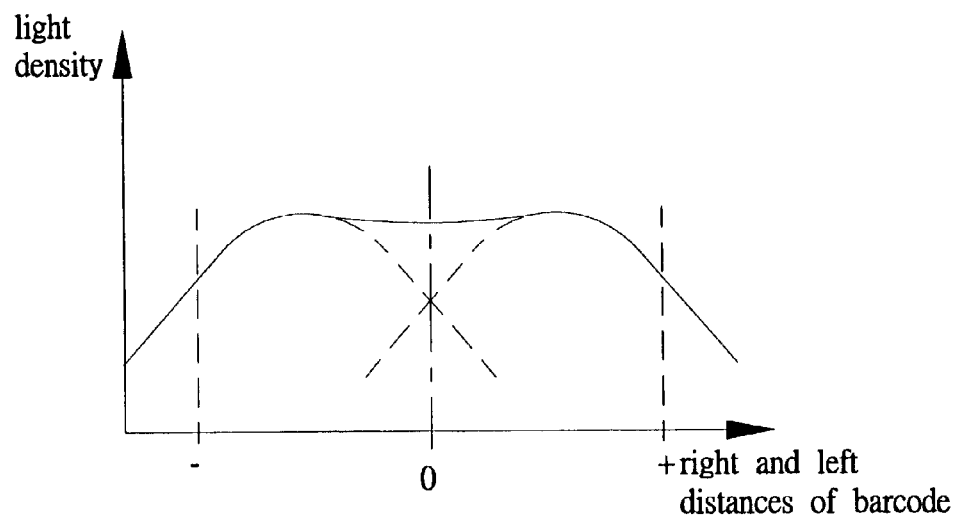
FIG. 9 shows a light intensity distribution diagram obtained from the structure shown in FIG. 8.

Also according to the above description, a horizontally located piano-convex column lens is adopted as the collimator 21 in the embodiment in FIG. 1, and hence the laser beams passing through the collimator 21 is converted as strip-shaped scanning light beams. In this embodiment, refer to FIG. 2, a beam splitter 61 is disposed with a tilted angle in the front of the projecting path of the scanning light beams from the laser emitter 10, and a reflector 71 is correspondingly disposed at the scanning light beam reflection path from the beam splitter 61, so as to have a portion of the scanning light beams penetrate through the beam splitter 61 and project to a barcode 50, whereas the other portion of the scanning light beams is reflected onto the corresponding reflector 71 and further reflected onto the same barcode 50. Using the above configuration, a light distribution as shown in FIG. 9 is obtained, and therefore production cost namely a set of laser emitter and a collimator is saved compared to the former prior art described in FIG. 8. Similarly, using the above structure (as shown in FIG. 2), the collimator 22 is an aspherical lens that allows the laser light beams passing through the collimator 22 and converting into point-shaped parallel light beams. The point-shaped parallel light beams then is converted into strip-shaped scanning light beams by a standing cylindrical lens 81 (82). In this embodiment, the beam splitter 61 and the reflector 71 may also be appropriately disposed at the projecting paths of the scanning light beams thereof for obtaining the objects as described in the embodiment shown in FIG. 1.

Referring to FIG. 3, another beam splitter 62 may also be disposed between the beam splitter 61 and the reflector 71, so as to have scanning light beams from three light sources project onto the barcode 50 from three different directions closed to the light condensing lens 30, thereby easily increasing another light source for evenly distributing the scanning light beams. Also, in this embodiment, the collimator 22 is an aspherical lens, and therefore a standing cylindrical lens 81 (82, 83) is disposed in front of the point-shaped parallel light beams, respectively, to convert the point-shaped parallel light beams into strip-shaped scanning light beams.

Figure 4:
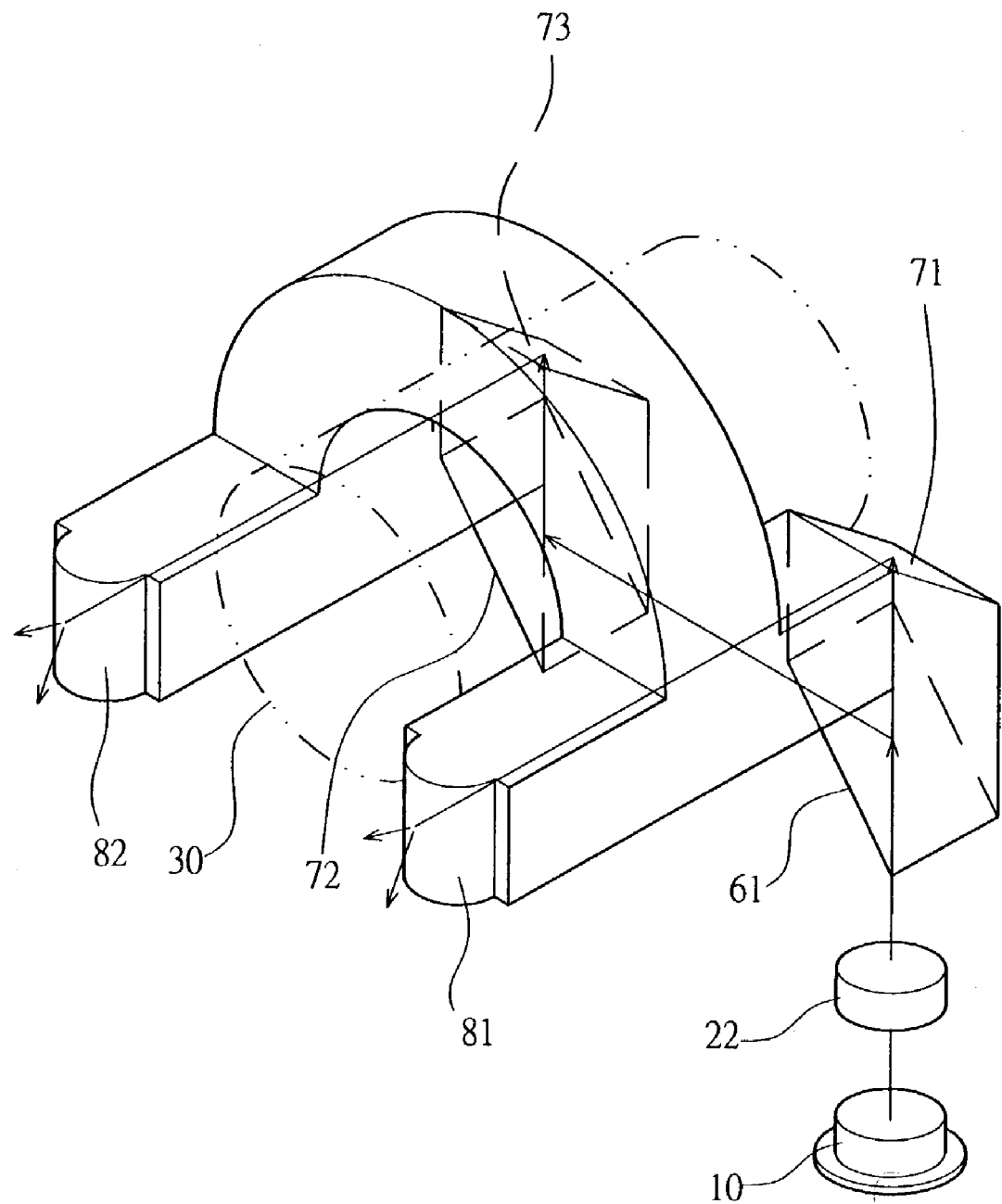
FIG. 4 shows an elevational view of a special prism made of a beam splitter and some reflectors in an embodiment according to the invention.

Also referring to the embodiment shown in FIG. 4, light beams from a laser emitter 10 disposed at one side of the light condensing lens are projected upward through an collimator 22, on which a beam splitter 61 is disposed. A reflector 71 is disposed above the beam splitter 61, a reflector 72 is disposed at one correspondingly side of the aforesaid beam splitter 61, and another reflector 73 is disposed above the reflector 72, so as to have the light beams reflected by the two reflectors 71 and 73 project outward. In addition, in order to have the projecting light beams directly convert into strip-shaped scanning light beams, standing cylindrical lenses 81 and 82 are disposed in front of the reflectors 71 and 73, respectively. Furthermore, in the embodiment, the beam splitter 61, the reflectors 71, 72 and 73, and the standing cylindrical lenses 81 and 82 may be a formed integral made of a transparent material (a prism having a specific shape for example), or may be separate elements as in the other embodiments, and the projecting directions of the light beams may be other appropriate directions as well.

Figure 5A:
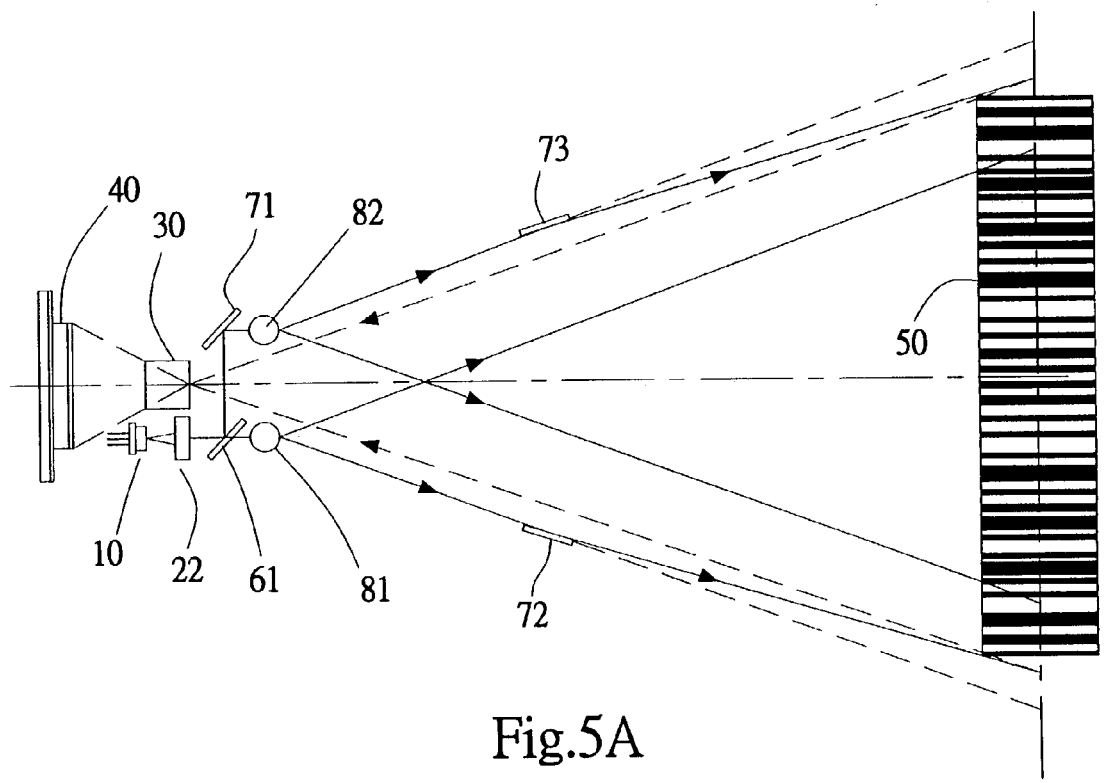
FIG. 5A shows a top view of another embodiment of the barcode scanner according to the invention.
Figure 5B:
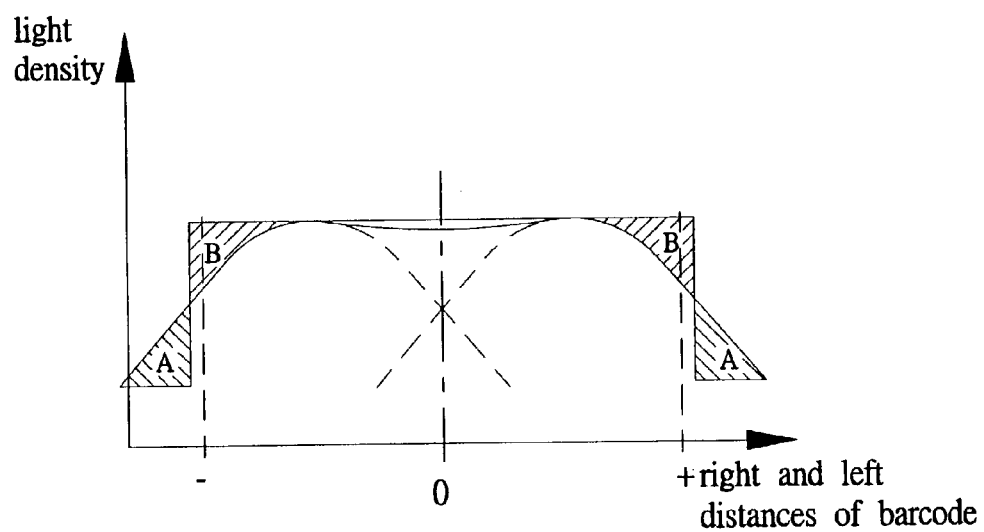
FIG. 5B shows a light intensity distribution diagram obtained from the barcode scanner in FIG. 5A according to the invention.
Figure 6:
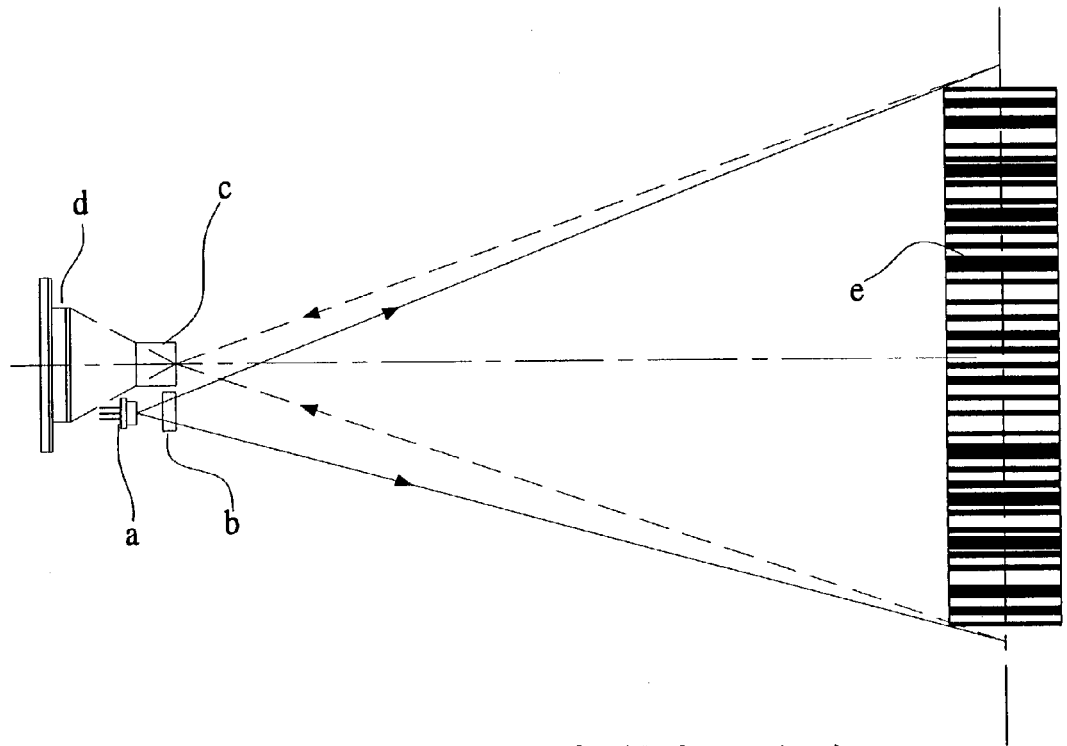
FIG. 6 shows a conventional top view of a prior structure 1.
Figure 7:
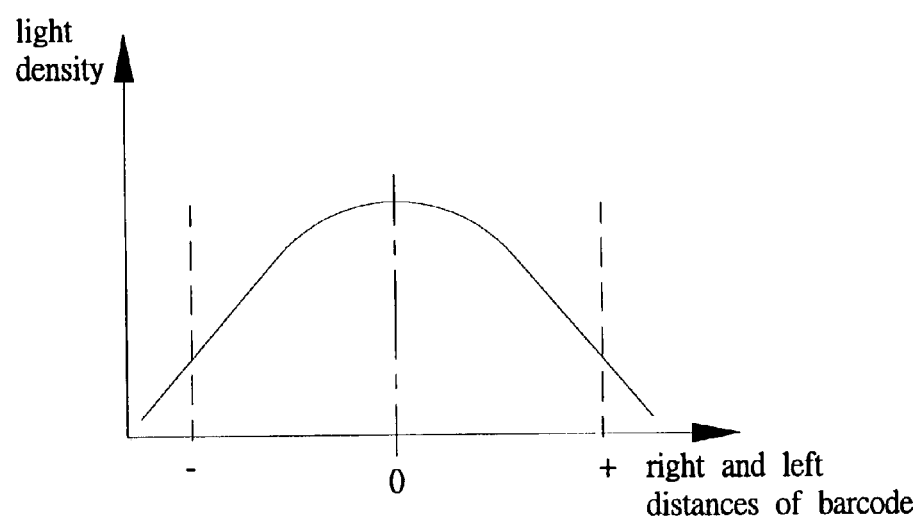
FIG. 7 shows a light intensity distribution diagram obtained from the structure shown in FIG. 6.

Referring to FIG. 5A, the embodiment shown includes standing cylindrical lenses 81 and 82 disposed in front of the beam splitter 61 and the reflector 71 shown in FIG. 2, and reflectors 72 and 73 are disposed at the two lateral sides of the scanning light beams from the standing cylindrical lenses 81 and 82, respectively, such that the light beams at the lateral sides of the two strip-shaped scanning light beams are reflected onto the barcode area before projecting onto the barcode 50. As shown FIG. 5B, the light beams at the two sides of the light intensity distribution diagram are weaker. However, the light beams exceeding to the ineffectual zones (the parallel oblique lines A) of the receiving plane are compensated to the area of the parallel oblique lines B by reflected from the reflectors 72 and 73, so that the light intensity as a whole approximates a rectangular curve in order to have the light beams more concentrated and reflected the barcode images more effectively onto the receiving plane of the linear light receiver 40.

Conclusive from the above, the structure provided by the invention enables the projecting light beams to be more concentrated while having an even distribution, as well as saving production cost and material namely laser emitters and collimators. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An optical scanner for reading a bar code comprising:
    a) a laser emitter emitting scanning light beams;
    b) a collimator located on a projecting path of the scanning light beams and receiving the scanning light beams from the laser emitter;
    c) a first beam splitter located on a projecting path of the scanning light beams between the collimator and the bar code, and splitting the scanning light beams into first and second light beam portions, the first light beam portion being directed on the bar code;
    d) a reflector is fixed on a projecting path of the second light beam portion between the first beam splitter and the bar code, and reflecting the second light beam portion on the bar code;
    e) a light condensing lens receiving and focusing a reflected image produced by the first and the second light beam portions; and
    f) a linear light receiver receiving a focused reflected image from the light condensing lens and producing a bar code signal, further comprising a second beam splitter located on a projecting path of the second light portion between the first beam splitter and the reflector, and splitting a third light portion from the second light portion, the third light portion being directed on the bar code, the reflected image is produced by the first, the second and the third light beam portions.

2. The optical scanner according to claim 1, wherein the collimator is a horizontally located plano-convex column lens.

3. The optical scanner according to claim 1, further comprising first, second and third standing cylindrical lenses, the collimator is an aspherical lens, the first standing cylindrical lens is located on a projecting path of the first light beam portion between the first beam splitter and the bar code, the second standing cylindrical lens is located on a projecting path of the second light beam portion between the reflector and the bar code, the third standing cylindrical lens is located on a projecting path of the third light beam portion between the second beam splitter and the bar code, wherein the first, second, and third standing cylindrical lenses convert point-shaped parallel light beams from the collimator into strip-shaped scanning light beams.

4. An optical scanner for reading a bar code comprising:
a) a laser emitter emitting scanning light beams;
b) a collimator located on a projecting path of the scanning light beams and receiving the scanning light beams from the laser emitter;
c) a first beam splitter located on a projecting path of the scanning light beams between the collimator and the bar code, and splitting the scanning light beams into first and second light beam portions, the first light beam portion being directed on the bar code;
d) a reflector is fixed on a projecting path of the second light beam portion between the first beam splitter and the bar code, and reflecting the second light beam portion on the bar code;
e) a light condensing lens receiving and focusing a reflected image produced by the first and the second light beam portions; and
f) a linear light receiver receiving a focused reflected image from the light condensing lens and producing a bar code signal, further comprising first and second standing cylindrical lenses, the collimator is an aspherical lens, the first standing cylindrical lens is located on a projecting path of the first light beam portion between the first beam splitter and the bar code, the second standing cylindrical lens is located on a projecting path of the second light beam portion between the reflector and the bar code, wherein the first and second standing cylindrical lenses convert point-shaped parallel light beams of the collimator into strip-shaped scanning light beams.

5. The optical scanner according to claim 4, further comprising two side reflectors, each of the two side reflectors is located on one of two lateral sides of the scanning light beams and reflects light beams at the lateral side having a weaker intensity toward the bar code.

6. The optical scanner according to claim 5, wherein the first beam splitter, the reflector, the first and second standing cylindrical lenses, and the two side reflectors are integrally formed.

7. An optical scanner for reading a bar code comprising:
a) a laser emitter emitting scanning light beams;
b) a collimator located on a projecting path of the scanning light beams and receiving the scanning light beams from the laser emitter;
c) a first beam splitter located on a projecting path of the scanning light beams between the collimator and the bar code, and splitting the scanning light beams into first and second light beam portions, the first light beam portion being directed on the bar code;
d) a reflector is fixed on a projecting path of the second light beam portion between the first beam splitter and the bar code, and reflecting the second light beam portion on the bar code;
e) a light condensing lens receiving and focusing a reflected image produced by the first and the second light beam portions; and
f) a linear light receiver receiving a focused reflected image from the light condensing lens and producing a bar code signal, further comprising two side reflectors, each of the two side reflectors is located on one of two lateral sides of the scanning light beams and reflects light beams at the lateral side having a weaker intensity toward the bar code.

* * * * *